(No Model.)
T. C. DILL.
SHAFT HANGER.
No. 593,742.
Patented Nov. 16, 1897.
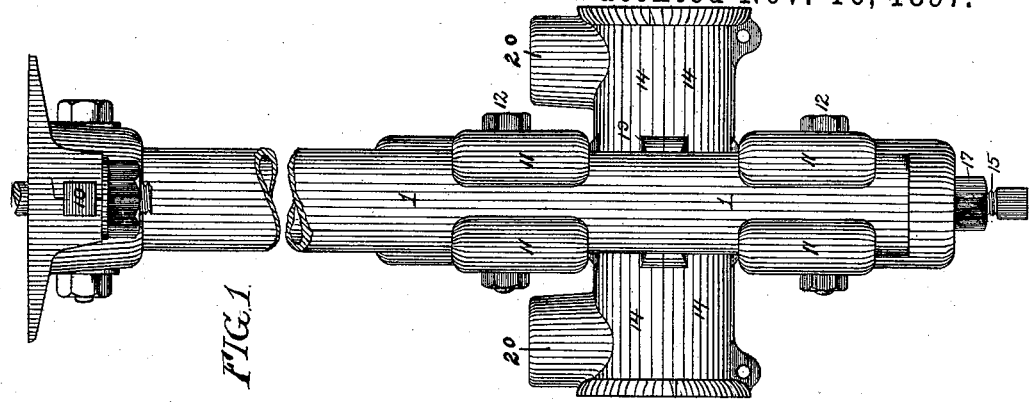
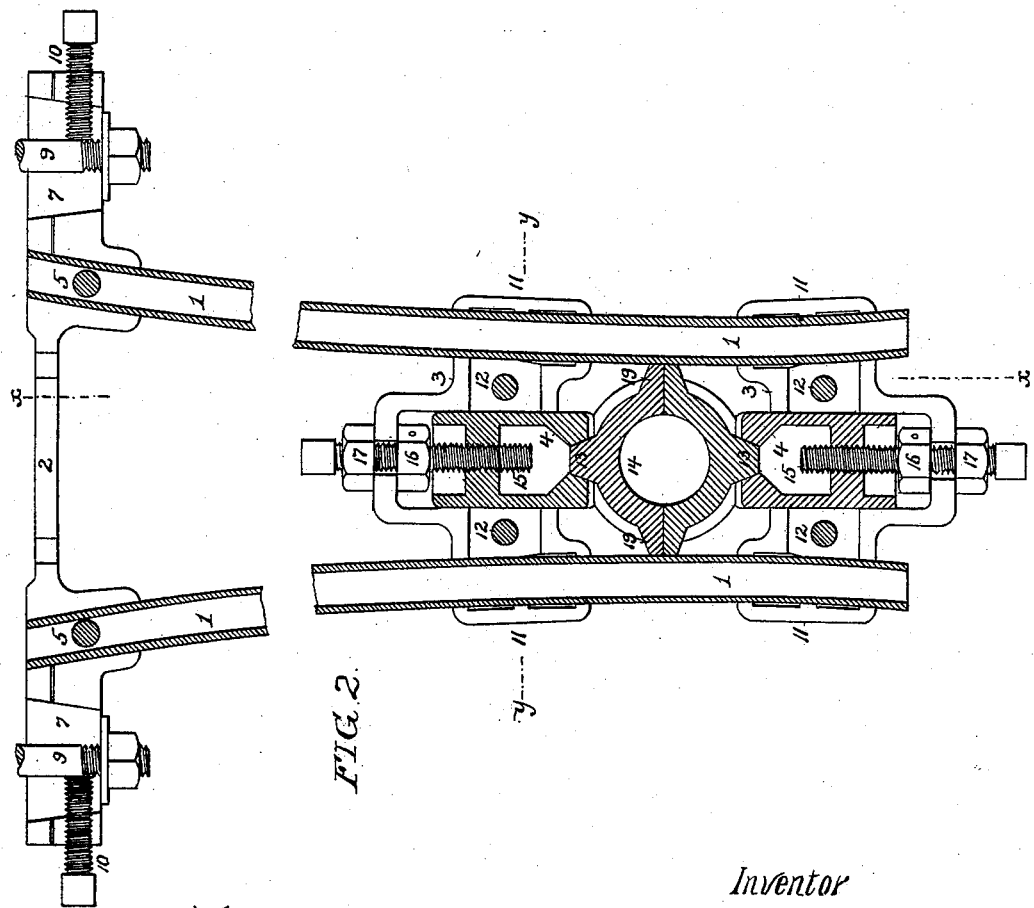
Witnesses
Charles De Cow
F. E. Bechtold
Inventor
Thomas C. Dill.
by his Attorneys
Howson & Howson (No Model.) 2 Sheets—Sheet 2.
T. C. DILL.
SHAFT HANGER.
No. 593,742. Patented Nov. 16, 1897.
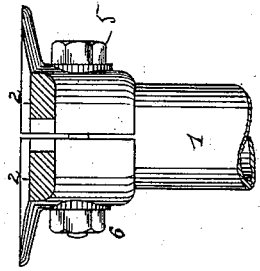
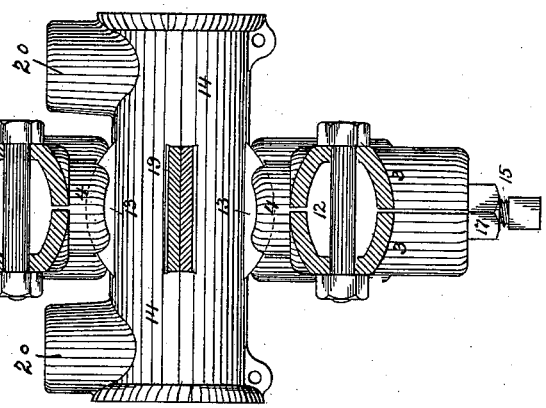
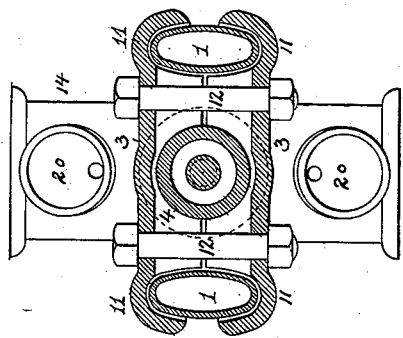
Witnesses
Charles De Cow
J. E. Bechtold
Inventor:
Thomas C. Dill
by his Attorneys
Howson & Howson

UNITED STATES PATENT OFFICE.

THOMAS C. DILL, OF PHILADELPHIA, PENNSYLVANIA, ASSIGNOR TO THE T. C. DILL MACHINE COMPANY, OF SAME PLACE.

SHAFT-HANGER.

SPECIFICATION forming part of Letters Patent No. 593,742, dated November 16, 1897.

Application filed April 1, 1897. Serial No. 630,279. (No model.)

*To all whom it may concern:*

Be it known that I, THOMAS C. DILL, a citizen of the United States, residing in Philadelphia, Pennsylvania, have invented certain Improvements in Shaft-Hangers, of which the following is a specification.

One object of my invention is to construct a light but extremely strong shaft-hanger.

A further object is to simplify the construction of the same by making its parts interchangeable, so that the assembling and fitting together or taking apart of the hanger can be readily accomplished; and a still further object is to permit of the use of the hanger in any desired position.

These objects I attain in the manner hereinafter set forth, reference being had to the accompanying drawings, in which—

Figure 1 is a side view of a shaft-hanger constructed in accordance with my invention. Fig. 2 is a transverse section of the same, partly in elevation. Fig. 3 is a plan or top view of the bracket-plates of the hanger. Fig. 4 is a sectional view on the line $x$ $x$, Fig. 2; and Fig. 5 is a sectional plan view on the line $y$ $y$, Fig. 2.

The hanger consists, essentially, of depending rods 1 1, bracket clamp-plates 2 2, box-holding clamp-plates 3 3, and box supporting and guiding blocks 4 4.

The depending rods 1 1 are in order to secure lightness made in tubular form and preferably flattened or of oval cross-section, as shown in Fig. 5, these tubes being slightly curved longitudinally, so as to flare outwardly at their upper ends and thereby increase the area of support.

The bracket clamp-plates 2 2 fit snugly to the upper ends of the rods 1 1 and are firmly clamped thereupon by bolts 5, passing through both bracket-plates and rods and provided with nuts 6. The bracket-plates are preferably provided with offset joints, as shown in Fig. 1, and with slots 7 for the reception of bolts 9, whereby the brackets are secured to the joist, stringer, ceiling, floor, post, pedestal, or other support for the hanger, lateral adjustment of the hanger on these bolts being permitted by the slots 7 and the locking of the hanger in position after adjustment being provided for by means of set-screws 10, which bear upon the bolts 9 and are adapted to threaded openings formed by recesses in the opposite halves of the outer portions of the bracket clamp-plates. Hence shifting of the hanger is prevented even should the nuts on the bolts 9 become loose.

The box-holding plates 3 have jaws 11, which fit snugly upon the rods 1 and are firmly clamped thereupon by means of bolts 12 passing through the clamp-plates on the inner sides of said rods.

The clamp-plates 3 are recessed for the reception of the box supporting and guiding blocks 4, which have at the inner ends tapered sockets for the reception of the tapered ribs 13 upon the upper and lower sides of the divided shaft-box 14, these ribs and sockets being curved longitudinally, as shown in Fig. 4, so that the shaft-boxes are free to adjust themselves to the alinement of the shafts. The blocks 4 can be adjusted vertically in the clamps 3 by means of screw-stems 15, which are adapted to threaded openings in the blocks and pass through openings formed by recessing the top and bottom halves of the clamping-plates 3, an inner collar 16, and an outer lock-nut 17 serving to secure the bolts in position after any adjustment of the blocks 4 has been effected, loosening of the nuts 17, however, permitting the turning of the screws 15 when further adjustment of the blocks 4 is necessary.

The inner collars 16 are in the present instance composed of nuts pinned on the screw-stems 15, but any available form of flange or collar may be used.

The parts of my improved shaft-hanger can be readily assembled, as the hanger-rods, the parts of the respective clamps, and the blocks 4 are interchangeable, ordinary bolts being relied upon for securing the parts together, and there being no weakening of the hanger-rods by the cutting of screw-threads thereon. Hence said rods can be made much lighter than usual without detracting from their necessary strength.

The upper and lower halves of the shaft-box have laterally-projecting wings 19, which when the two halves of the box are brought together form lugs of the same character as the lugs 13, and are, like the latter, adapted to enter the sockets of the blocks 4. Hence the hanger can be used either as a depending hanger, as an upwardly-projecting pedestal, or as a post-hanger projecting laterally, the cups 20 being upright in either case when grease is used, or, if desired, being reversed and used in connection with depending oil-cups and having feed-wicks passing up through them to the bore of the box. In whichever position the box is used the blocks 4 serve not only to support the box, but also to hold the two parts of the same together. Thus when the box is in the position shown in Fig. 2 the two parts are held together by the direct pressure of the blocks 4, and when the wings 19 are adapted to the openings of the blocks 4 the two parts of the box are held together by the clamping action of said blocks upon said wings.

Having thus described my invention, I claim and desire to secure by Letters Patent—

1. The combination in a shaft-hanger, of opposite hanger-rods, shaft-box-holding clamp-plates having jaws for embracing said rods, and bolts securing said clamp-plates together, substantially as specified.

2. The combination in a shaft-hanger, of the hanger-rods, bracket clamp-plates having jaws for embracing said rods, and bolts for securing said clamp-plates together, substantially as specified.

3. The combination in a shaft-hanger, of the hanger-rods, bracket clamp-plates having jaws for embracing said rods and bolts passing through said jaws and through the rods and serving to secure the clamp-plates together and to the rods, substantially as specified.

4. The combination with a shaft-hanger bracket having laterally-elongated slots, with securing-bolts passing through said slots, and set-screws projecting into said slots and bearing against the securing-bolts to lock the bracket thereto, substantially as specified.

5. A shaft-hanger in which are combined hanger-rods, bracket clamp-plates having jaws for embracing said rods, and laterally-elongated slots, supporting-bolts passing through said slots, bolts passing through the bracket clamp-plates and serving to secure the same together and to the hanger-rods, and adjusting and locking set-screws adapted to threaded openings in the bracket clamp-plates and projecting into the ends of the elongated slots therein so as to bear upon the supporting-bolts which pass through said slots, substantially as specified.

6. The combination in a shaft-hanger, of the hanger-rods, shaft-box-holding clamp-plates having jaws for embracing said rods, bolts for securing said clamp-plates together, and shaft-box supporting and guiding blocks contained in recesses in said clamp-plates, substantially as specified.

7. The combination in a shaft-hanger, of the hanger-rods, shaft-box-holding clamp-plates having jaws for embracing said rods, bolts for securing said clamp-plates together, shaft-box supporting and guiding blocks adapted to recesses in the clamp-plates, and adjusting-screws carried by said clamp-plates and engaging said blocks, substantially as specified.

8. The combination in a shaft-hanger, of the hanger-rods, shaft-box-holding clamp-plates having jaws for embracing said rods, bolts for securing said clamp-plates together, shaft-box supporting and guiding blocks adapted to recesses in said clamp-plates, set-screws carried by said clamp-plates and engaging with said blocks, and locking collars and nuts on said adjusting-screws, substantially as specified.

9. The combination in a shaft-hanger, of the hanger-rods, shaft-box-holding clamp-plates having jaws embracing said rods, bolts for securing said clamp-plates together, shaft-boxes having ribs at top and bottom, and box supporting and guiding blocks adapted to recesses in the clamp-plates and having sockets for the reception of said ribs, substantially as specified.

10. The combination in a shaft-hanger, of the hanger-rods, shaft-box-holding clamp-plates having jaws for embracing said rods, bolts for securing said clamp-plates together, a shaft-box having ribs at top and bottom, box supporting and guiding blocks adapted to recesses in the clamp-plates and having sockets for the reception of said ribs, and means for vertically adjusting said blocks in the recesses of the clamp-plates, substantially as specified.

11. A divided shaft-box having ribs at top and bottom, and side wings on each part, which, when the box is closed, form side ribs, and a hanger structure having blocks with sockets for the reception of either the top and bottom or side ribs of the box, substantially as specified.

In testimony whereof I have signed my name to this specification in the presence of two subscribing witnesses.

THOMAS C. DILL.

Witnesses:
F. E. BECHTOLD,
JOS. H. KLEIN.